May 30, 1961  R. VAN BRAKEL  2,986,149
FLOOR MAT CLEANING MACHINE
Filed April 21, 1958  2 Sheets-Sheet 1

INVENTOR.
R. Van Brakel
BY
Julius Louis Rubinstein
Attorney

May 30, 1961 R. VAN BRAKEL 2,986,149
FLOOR MAT CLEANING MACHINE
Filed April 21, 1958 2 Sheets-Sheet 2
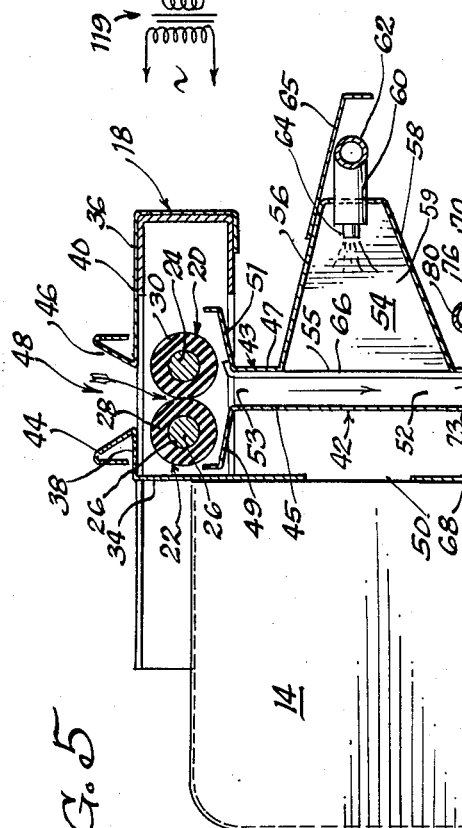
INVENTOR.
R. Van Brakel
BY
Julius Louis Rubenstein
Attorney United States Patent Office 2,986,149
Patented May 30, 1961

2,986,149

FLOOR MAT CLEANING MACHINE

Russel Van Brakel, Woodale, Ill., assignor to Jack Flapan, Chicago, Ill.

Filed Apr. 21, 1958, Ser. No. 729,856

2 Claims. (Cl. 134—64)

This invention relates to a cleaning machine, and more particularly to a machine for automatically cleaning automobile floor mats.

Time and labor costs are an important factor in modern automobile washing establishments, and particularly in those establishments which rely upon large and complicated car washing machines and numbers of employees to completely wash and clean a car in a matter of minutes. One problem associated with such car washing establishments has been the handling of the automobile floor mats. Heretofore, when an automobile was brought in for washing, the floor mats had to be cleaned manually. It will be appreciated that in car washing establishments which are geared to handle hundreds of automobiles daily, the time spent in manually washing the automobile floor mats quickly becomes a significant portion of the overhead costs. What is needed therefore and comprises the principal object of this invention is a machine for automatically cleaning automobile floor mats and similar articles.

Yet another object of this invention is to provide an apparatus for automatically cleaning automobile floor mats which is simple and economical to make.

A further object of this invention is to provide an apparatus for automatically and continuously cleaning at least one surface of a flexible piece of strip material.

Still a further object of this invention is to provide an apparatus for carrying on in a continuous manner successive treatments of at least one surface of a piece of flexible sheet material.

Yet a further object of this invention is to provide an apparatus which is adapted to clean more than one automobile floor mat simultaneously.

These and other objects of this invention will become more apparent when read in the light of the accompanying drawings and specifications wherein:

Fig. 5 is a side sectional view of a portion of the apparatus;

Fig. 6 is a schematic illustration of the control circuit for the apparatus.

Figure 1:
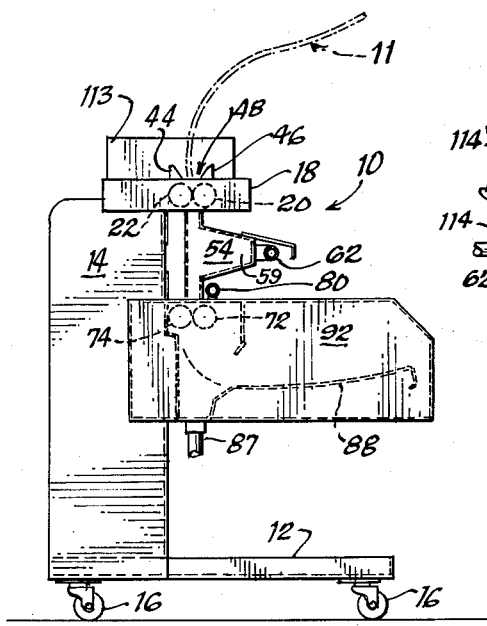
Fig. 1 is a side elevational view of the apparatus constructed according to the principles of this invention.

Referring now to Fig. 1 of the drawings, there is shown one embodiment of a floor mat cleaning machine indicated generally by the reference numeral 10. The cleaning machine comprises a platform 12 upon which may be mounted a combined support and housing 14. The housing is adapted to contain the drive elements shown in Fig. 3. In the example shown the platform 12 is supported on wheels or rollers 16, so the cleaning machine may be moved readily.

As shown in Fig. 5, a casing 18, containing a pair of rotatable driven feed rollers 20 and 22 is connected to the housing 14, by any conventional means (not shown). The feed rollers comprise centrally disposed shafts 24 and 26, which are mounted inside the usual hard rubber cylindrical coverings 28 and 30. The casing is fabricated from sheet metal sections 34 and 36, and section 36 is hingedly mounted on the side frames of the housing by any conventional means, in order to permit access to the interior of the casing for purposes of cleaning and adjustment. The top surfaces 38 and 40 of sections 34 and 36 are shaped to form a pair of lips 44 and 46, which define a slotted opening 48. This opening is to permit the entry of the floor mats 11 into the machine.

Mounted directly below casing 18, and rollers 20 and 22, and connected to the sides of the machine 10, by a conventional means, are a pair of guide sections 42 and 43. Portions 45 and 47 of these guide sections are planar and are disposed in spaced parallel relation to each other to define a vertically disposed guide passageway 52 for the passage of the floor mats 11 through the machine. The upper edges 49 and 51 of these sections diverge from each other to form an enlarged entrance 53 to this passageway just below rollers 20 and 22 in order to insure the entrance of the floor mat therein.

The planar portion 47 of section 43 is provided with a recess 54 formed by the integral converging top and bottom walls 56 and 58, side walls 59, see Fig. 1, and a vertical end wall 61. The end wall 61 is provided with a laterally extending slot 60 to permit entry of the cleaning solution inside the machine.

A pipe or manifold 62 is mounted on the machine by any conventional means and is disposed in spaced parallel relation to the slot 60 in end wall 61. The pipe is provided with a plurality of nozzles 64 which project into the slot 60 and are perpendicular to the passageway 52.

The mouth 55 of the recess 54 is large enough to permit the accidental entrance of the floor mat therein which could block the passageway 52 and consequently jam the machine. To prevent this from happening, a plurality of vertical rods 66 forming a grill-like structure parallel to the planar portion 45 of section 42, are mounted on the planar portion 47 of section 43. This guides the mat 11 as it passes down through the passageway 52 and prevents it from entering recess 54. At the same time, the grill holds the mat in perpendicular relation to the direction of the cleaning solution coming from the nozzles 64. The cleaning solution, in this particular embodiment happens to be a mixture of detergent and steam, supplied by a conventional machine, not shown, but other cleaning solutions may also be useful. To protect the operators of this floor mat cleaner from accidentally touching the hot pipe or manifold 62, a safety shield 65 of any convenient shape is mounted on one of the walls of the recess. In the example shown in Fig. 5, the safety shield is attached to the upper wall 56 of the recess 54. If it should be desirable to clean both sides of the cleaning mat, an additional manifold with attached nozzles could be mounted inside housing 14 by any conventional means. These nozzles could be directed toward an opening which could be formed in the planar portion 45 of section 42. In this respect, it is noted that the modification disclosed in the drawing is best suited to clean only one floor mat at a time. Since automobiles frequently have more than one floor mat, it is apparent that if the additional manifold and nozzles described above were mounted on the machine and aimed into passageway 52, then two mats could be inserted into the machine in back to back relationship and both could be cleaned simultaneously. This modification would further decrease the labor costs in the cleaning establishment.

The lower extremities of sections 42 and 43 are bent to form the horizontal upper walls 68 and 70 of the rinsing enclosure 71. A pair of rollers 72 and 74 similar in construction to rollers 20 and 22 and parallel thereto are disposed directly beneath the exit 73 of passageway 52. The upper wall 70 of the rinsing enclosure 71 is provided with an elongated transverse slot or a plurality of nozzle receiving openings 76 for receiving a plurality of nozzles 78 extending from the supply pipe or manifold 80. This manifold, in this embodiment is adapted to conduct water and is mounted in spaced parallel relation to the upper wall 70.

The edge 73 of wall 70 is bent vertically, to form one side of the rinsing enclosure and to act as a shield to prevent the rinse water from splashing out of the machine. The other side of the rinsing enclosure 71 is formed by a vertical sheet metal section 84 secured in any convenient fashion to wall 50 of the housing 14. The bottom of section 84 is shaped to form a sump 86 with a drain 87 extending therefrom. Integral with one side of the sump 86 is an arcuately shaped guide and supporting ledge 88 which terminates in a vertically depending flange 90. As seen, this ledge is inclined upwardly to permit the rinse water to drain back into the sump.

A corrugated perforate sheet or a plurality of spaced parallel rods 89 are mounted in coextensive engagement with the supporting ledge 88 and its flange 90, and extend beneath rollers 72 and 74 to guide the floor mat as it leaves the passageway 52 and direct it beneath the rinsing nozzles 78. A pair of vertical side walls 92 are connected to the side edges of the supporting ledge 88 to enclose the sides of the rinsing unit 71 and to keep the floor mats thereon. The drain 87 may be connected to the local sewage system by any conventional means, not shown.

Figure 2:
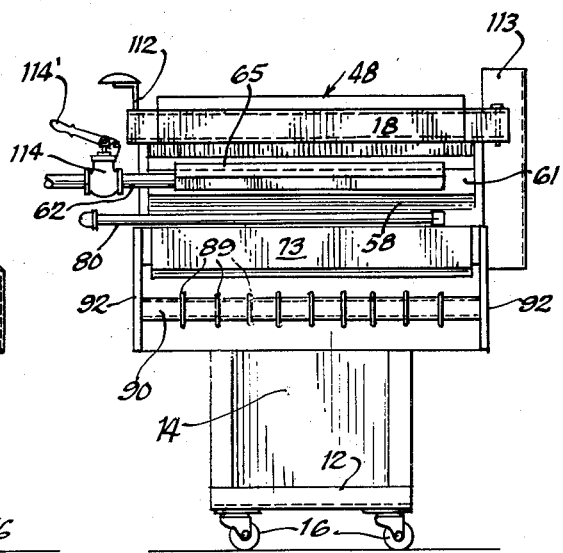
Fig. 2 is a front elevational view of the apparatus disclosed in Fig. 1.
Figure 3:
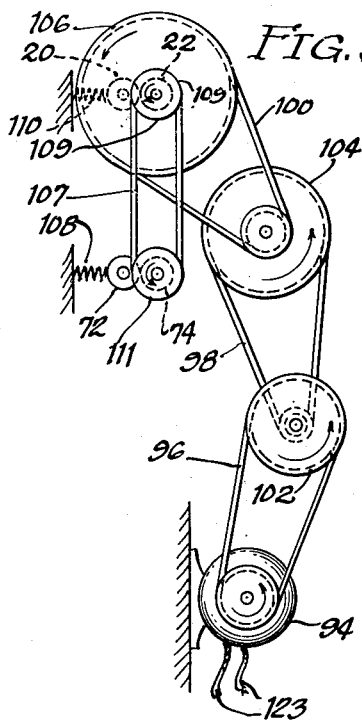
Fig. 3 is a schematic illustration of the mechanical drive in the apparatus.

Rollers 20, 22, 72, and 74, rotate in the direction indicated by the curved arrows in Fig. 5. As seen in Fig. 3, only rollers 72 and 74 are driven. The driving mechanism is mounted inside housing 14 by any conventional means for protection against the corrosive and damaging effects of the cleaning solutions and rinse water and comprises a motor 94 which is connected to power leads 123. This motor drives belts 96, 98, and 100 and pulleys 102, 104, and 106 in a conventional power transmission system. In addition, a belt 107 and pulleys 109 and 111 are connected as shown to transfer the drive from roller 22 to roller 74. These are mounted inside the casing 113 shown in Figs. 2 and 3.

The mating rollers 20 and 72 are biased by means of the schematically illustrated springs 108 and 110 into contact with rollers 22 and 74 so that they are rotated by this contact, or by the passage of the floor mats between them. In addition, an actuating arm 112, see Fig. 2, is connected to the rollers by any conventional means, not shown, so that the adjacent rollers can be separated from each other for purposes of inspection or to eliminate jamming. Such mechanisms are typically found associated with washing machine ringers.

Figure 4:
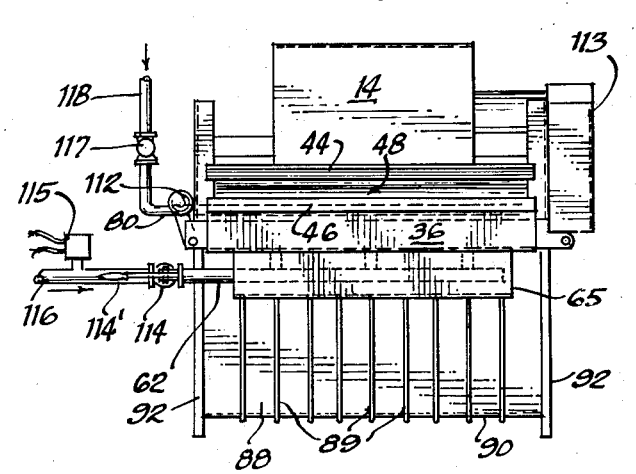
Fig. 4 is a top elevational view of the apparatus.

As seen in Figs. 2 and 4, manifold 62 is provided with a control valve 114 including an actuating lever 114', and a pressure operated switch 115 immediately upstream thereof in a supply line 116. As stated above, manifold 62, along with supply line 116 is connected to a conventional source (not shown) of steam mixed with a detergent. The other manifold 80 is provided with a normally closed solenoid valve 117 in a supply line 118 which is connected to a source (not illustrated) of rinse water. As described above, this water is to be sprayed against the car floor mat 11 to wash off the cleaning mixture as the mat leaves the washing machine.

In operation, when the lever arm 114' is actuated, the control valve 114 opens to permit delivery of the cleaning mixture into the manifold 62. As this happens the pressure in supply line 116 will drop. This causes the pressure actuated switch 115 communicating with the supply line 116 to close which completes a control circuit schematically illustrated in Fig. 6.

This control circuit may conveniently be energized by a conventional 6 volt transformer 119. When the circuit is completed the solenoid valve 117 is energized and operates to open the rinse water supply line 118. In addition, a relay 121 may be connected in parallel with solenoid valve 117 to start the motor 94 turning the rollers simultaneously with the flow of the cleaning solution and the rinse water. In a similar manner, the closing of the control valve 114' by the operator simultaneously cuts off the supply of steam and detergent, the flow of rinse water, and stops the motor 94. This arrangement is useful because the cleaning machine consumes no power, cleaning solution, or rinse water until it is actually cleaning a floor mat.

To operate the machine 10, it is only necessary to actuate the lever arm 114' and move valve 114 to its open position as described above. Then the operator will feed in the end of the car mat 11 through the slotted opening 48 where it is gripped by the rotating rollers 20 and 22, and pulled vertically downward through the passageway 52. This leaves the operator free to assist the other employees in washing the cars while the mats are being cleaned.

The vertically spaced relation of the roller pairs and the consequent vertical movement of mat 11, is very important since the mat is moved by the force of gravity, and consequently this machine does not require any conveyor system to carry it through the machine, which would be necessary if the roller pairs, for example, were in horizontally spaced relation to each other. Since no special conveyor system is required, the floor mat washing machine can be made more compact and at a lower cost than would otherwise be required.

As the mat 11 passes over the vertical grill rods 66, the pressurized spray of steam or hot water mixed with a suitable detergent impinges directly on one surface of the mat 11. Next the mat passes between rollers 72 and 74 and moves onto a ledge or shelf 88 lined with a corrugated sheet or spaced parallel bars 89, where the mat is rinsed free of the accumulation of dirt and the cleaning solution. The corrugated sheet or parallel rods 89 described above, in addition to guiding the floor mat 11 onto the ledge 88 have another important function. Floor mats are frequently formed from rubber sheet, and their bottom surfaces are often planar. If the surface of ledge 88 were also planar then a vacuum could form between the bottom surface of the floor mat and the planar surface of ledge 88, causing the floor mat to stick to the ledge and jam the machine. The provision of the corrugated lining or the spaced parallel bars holds the mat slightly above the surface of ledge or shelf 88 to prevent the formation of such a vacuum and consequently prevents jamming. In addition, these formations reduce friction between the mat and the ledge and expedite the movement of the mat therealong.

It is further noted that additional rinsing nozzles could be mounted in the sump by any conventional means and directed against the under surface of the ledge 88. If this portion of the ledge were perforate, this arrangement could give the bottom surface of the floor mat a cursory cleaning. In addition, as described above, if two floor mats were inserted in the cleaning machine 10 in back to back relationship, both could be washed simultaneously, and these proposed nozzles would rinse off the top surface of the bottom floor mat as they leave the machine. These nozzles would also have another beneficial effect since they would assist in the movement of the mats on the ledge by decreasing in some measure their frictional resistance, thus further decreasing the power requirements of the machine.

It will be seen from the description given above that this automatic floor mat cleaning machine is a compact and unitary structure capable of fast and efficient operation. The design is such that it can also be used to treat rolls of flexible sheet material which would pass through the machine.

As a further possible modification, the conventional steam-detergent apparatus used with this machine could be incorporated into an expanded housing as to make the apparatus dependent only on an electric power source and a source of water.

Thus the invention is subject to embodiment into a variety of forms and uses without departing from the spirit or essential characteristics of the invention as set forth in the claims, and the present embodiment is therefore to be considered as illustrative and not restrictive, and it is intended to include all changes which come within the scope and range of the appended claims.

What is claimed is:

1. A machine for washing mats comprising in combination means for feeding a mat through the machine in a predetermined generally vertical path, material directing means positioned in effective relation with said path and adapted to direct a cleaning material against at least one surface of a mat traversing said path, means including a sump portion and a generally horizontal stationary shelf portion, said shelf portion positioned a distance below the said vertical path in a position to receive the mat and extending horizontally therebeyond with a length comparable to the length of a mat, stationary deflecting means extending above the surface of the shelf portion and extending to the end of said path whereby said stationary deflecting means receives the mat as it leaves the vertical path and deflects it along said shelf portion and holds the mat slightly above the surface of the shelf portion for facilitating the movement of said mat therealong by preventing it from sticking to the shelf portion.

2. The machine described in claim 1 wherein said sump portion is positioned directly below said generally vertical path and said deflecting means is positioned between the lower end of said path and said sump portion for defining drainage openings to said sump portion.

References Cited in the file of this patent

UNITED STATES PATENTS

| | | |
|---|---|---|
| 392,082 | Turner | Oct. 30, 1888 |
| 1,104,498 | Hasburg | July 21, 1914 |
| 1,809,642 | Sperry | June 9, 1931 |
| 1,930,575 | Wynd et al. | Oct. 17, 1933 |
| 2,304,592 | Pauly | Dec. 8, 1942 |
| 2,651,065 | O'Connor | Sept. 8, 1953 |
| 2,785,560 | Ketchum et al. | Mar. 19, 1957 |
| 2,807,686 | Clendenin | Sept. 24, 1957 |